(12) United States Patent
Inoue et al.

(10) Patent No.: US 10,399,633 B2
(45) Date of Patent: Sep. 3, 2019

(54) BICYCLE PEDAL

(71) Applicant: SHIMANO INC., Sakai (JP)

(72) Inventors: Akira Inoue, Sakai (JP); Takuro Yamane, Sakai (JP)

(73) Assignee: SHIMANO INC., Sakai (JP)

( * ) Notice: Subject to any disclaimer, the term of this patent is extended or adjusted under 35 U.S.C. 154(b) by 108 days.

(21) Appl. No.: 15/582,775

(22) Filed: May 1, 2017

(65) Prior Publication Data

US 2018/0312219 A1 Nov. 1, 2018

(51) Int. Cl.
*B62M 3/08* (2006.01)
*B62M 1/36* (2013.01)

(52) U.S. Cl.
CPC ............... *B62M 3/086* (2013.01); *B62M 1/36* (2013.01)

(58) Field of Classification Search
CPC .................................. B62M 3/086; B62M 1/36
See application file for complete search history.

(56) References Cited

U.S. PATENT DOCUMENTS

| | | | | |
|---|---|---|---|---|
| 8,720,305 | B1* | 5/2014 | Inoue | B62M 3/086 74/594.6 |
| 9,969,460 | B1* | 5/2018 | Chen | B62M 3/086 |
| 2012/0125147 | A1* | 5/2012 | Inoue | B62M 3/086 74/594.6 |

* cited by examiner

*Primary Examiner* — Vicky A Johnson
(74) *Attorney, Agent, or Firm* — Mori & Ward, LLP

(57) ABSTRACT

A bicycle pedal comprises a pedal axle, a pedal body, a movable member, and an actuator. The pedal axle is configured to be secured to a crank arm having a longitudinal axis extending from a rotational axis to a crank rotational axis of the crank arm. The pedal body is rotatably coupled to the pedal axle about the rotational axis. The pedal body has a reference axis perpendicular to the rotational axis of the pedal axle. The movable member is movable relative to the pedal body from a rest position toward an actuated position. The actuator is configured to move the movable member from the rest position toward the actuated position in response to a first relative angle defined between the reference axis and the longitudinal axis of the crank aim when viewed in an axial direction parallel to the rotational axis of the pedal axle.

21 Claims, 19 Drawing Sheets

BICYCLE PEDAL

BACKGROUND OF THE INVENTION

Field of the Invention

The present invention relates to a bicycle pedal.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a pedal.

SUMMARY OF THE INVENTION

In accordance with a first aspect of the present invention, a bicycle pedal comprises a pedal axle, a pedal body, a movable member, and an actuator. The pedal axle defines a rotational axis. The pedal axle is configured to be secured to a crank arm having a longitudinal axis extending from the rotational axis to a crank rotational axis of the crank arm. The pedal body is rotatably coupled to the pedal axle about the rotational axis. The pedal body has a reference axis perpendicular to the rotational axis of the pedal axle. The movable member is movable relative to the pedal body from a rest position toward an actuated position. The actuator is configured to move the movable member from the rest position toward the actuated position in response to a first relative angle defined between the reference axis and the longitudinal axis of the crank arm when viewed in an axial direction parallel to the rotational axis of the pedal axle.

With the bicycle pedal according to the first aspect, it is possible to smoothen a step-in operation of the bicycle pedal using a relative movement between the pedal body and the crank arm.

In accordance with a second aspect of the present invention, the bicycle pedal according to the first aspect further comprises a cleat engagement part coupled to the pedal body. The movable member includes an additional cleat engagement part spaced apart from the cleat engagement part.

With the bicycle pedal according to the second aspect, it is possible to hold a cleat between the cleat engagement part and the additional cleat engagement part.

In accordance with a third aspect of the present invention, the bicycle pedal according to the first or second aspect is configured so that the actuator includes an actuation part engageable with at least one of the pedal axle and the crank arm in response to a relative rotation between the pedal body and the crank arm about the rotational axis.

With the bicycle pedal according to the third aspect, it is possible to transmit the relative movement of the pedal body and the crank arm to the actuator.

In accordance with a fourth aspect of the present invention, the bicycle pedal according to the third aspect is configured so that the pedal axle includes a first axle end configured to be engaged with the crank arm. The actuation part is engageable with the first axle end in response to the relative rotation between the pedal body and the crank arm about the rotational axis.

With the bicycle pedal according to the fourth aspect, it is possible to effectively transmit the relative movement of the pedal body and the crank arm to the actuator.

In accordance with a fifth aspect of the present invention, the bicycle pedal according to the fourth aspect is configured so that the actuator is provided between the first axle end and the pedal body in the axial direction.

With the bicycle pedal according to the fifth aspect, it is possible to make the bicycle pedal compact.

In accordance with a sixth aspect of the present invention, the bicycle pedal according to any one of the third to fifth aspects is configured so that the actuator is movable relative to the pedal axle from a non-actuation position toward an actuation position to move the movable member relative to the pedal axle from the rest position toward the actuated position.

With the bicycle pedal according to the sixth aspect, it is possible to move the movable member using a movement of the actuator.

In accordance with a seventh aspect of the present invention, the bicycle pedal according to the sixth aspect is configured so that the actuation part is engageable with the at least one of the pedal axle and the crank arm in response to the relative rotation between the pedal body and the crank arm about the rotational axis to move the actuator from the non-actuation position toward the actuation position.

With the bicycle pedal according to the seventh aspect, it is possible to effectively transmit the relative movement of the pedal body and the crank arm to the actuator.

In accordance with an eighth aspect of the present invention, the bicycle pedal according to the sixth or seventh aspect is configured so that the actuator is movable relative to the pedal axle from the non-actuation position toward the actuation position to move away from the crank arm in the axial direction.

With the bicycle pedal according to the eighth aspect, it is possible to reduce an interference between the actuator and the crank arm.

In accordance with a ninth aspect of the present invention, the bicycle pedal according to any one of the sixth to eighth aspects is configured so that the actuation part is movable relative to the at least one of the pedal axle and the crank arm without engaging with the at least one of the pedal axle and the crank arm in an actuation state where the actuator is at the actuation position.

With the bicycle pedal according to the ninth aspect, it is possible to prevent an interference between the actuation part and the at least one of the pedal axle and the crank arm.

In accordance with a tenth aspect of the present invention, the bicycle pedal according to any one of the sixth to ninth aspects further comprises a positioning structure configured to position the actuator at the actuation position.

With the bicycle pedal according to the tenth aspect, it is possible to certainly prevent an interference between the actuation part and the at least one of the pedal axle and the crank arm.

In accordance with an eleventh aspect of the present invention, the bicycle pedal according to the tenth aspect is configured so that the positioning structure includes an actuation-position biasing member to bias the actuator toward the actuation position.

With the bicycle pedal according to the eleventh aspect, it is possible to stably position the actuator at the actuation position.

In accordance with a twelfth aspect of the present invention, the bicycle pedal according to the eleventh aspect is configured so that the positioning structure includes a positioning part configured to restrict a relative movement between the pedal body and the actuator in an actuation state where the actuator is at the actuation position.

With the bicycle pedal according to the twelfth aspect, it is possible to more stably position the actuator at the actuation position.

In accordance with a thirteenth aspect of the present invention, the bicycle pedal according to any one of the sixth to twelfth aspects further comprises a release structure configured to move the actuator from the actuation position to the non-actuation position.

With the bicycle pedal according to the thirteenth aspect, it is possible to easily switch a position of the actuator from the actuation position to the non-actuation position using the release structure.

In accordance with a fourteenth aspect of the present invention, the bicycle pedal according to the thirteenth aspect is configured so that the release structure is movably coupled to the pedal body.

With the bicycle pedal according to the fourteenth aspect, it is possible to stably move the release structure relative to the pedal body and the actuator.

In accordance with a fifteenth aspect of the present invention, the bicycle pedal according to the fourteenth aspect is configured so that the release structure is pivotally coupled to the pedal body.

With the bicycle pedal according to the fifteenth aspect, it is possible to more stably move the release structure relative to the pedal body and the actuator.

In accordance with a sixteenth aspect of the present invention, the bicycle pedal according to the fourteenth or fifteenth aspect is configured so that the release structure includes an engagement portion engageable with a cleat to move the actuator from the actuation position to the non-actuation position.

With the bicycle pedal according to the sixteenth aspect, it is possible to move the release structure using a movement of the cleat.

In accordance with a seventeenth aspect of the present invention, the bicycle pedal according to any one of the first to sixteenth aspects is configured so that the movable member includes a coupling part coupled to the actuator.

With the bicycle pedal according to the seventeenth aspect, it is possible to move the movable member along with the actuator.

In accordance with an eighteenth aspect of the present invention, the bicycle pedal according to the seventeenth aspect is configured so that the actuator is movably coupled to the coupling part.

With the bicycle pedal according to the eighteenth aspect, it is possible to smoothly move the movable member along with the actuator relative to the pedal body.

In accordance with a nineteenth aspect of the present invention, the bicycle pedal according to the eighteenth aspect is configured so that the actuator is pivotally coupled to the coupling part about a pivot axis non-parallel to the rotational axis of the pedal axle.

With the bicycle pedal according to the nineteenth aspect, it is possible to more smoothly move the movable member along with the actuator relative to the pedal body.

In accordance with a twentieth aspect of the present invention, the bicycle pedal according to any one of the first to nineteenth aspects is configured so that the movable member and the actuator are rotatable relative to the pedal axle about the rotational axis.

With the bicycle pedal according to the twentieth aspect, it is possible to smoothly move the actuator and the movable member relative to the pedal body.

In accordance with a twenty-first aspect of the present invention, the bicycle pedal according to any one of the first to twentieth aspects further comprises a rest-position biasing member to bias the movable member toward the rest position.

With the bicycle pedal according to the twenty-first aspect, it is possible to stably position the movable member at the rest position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
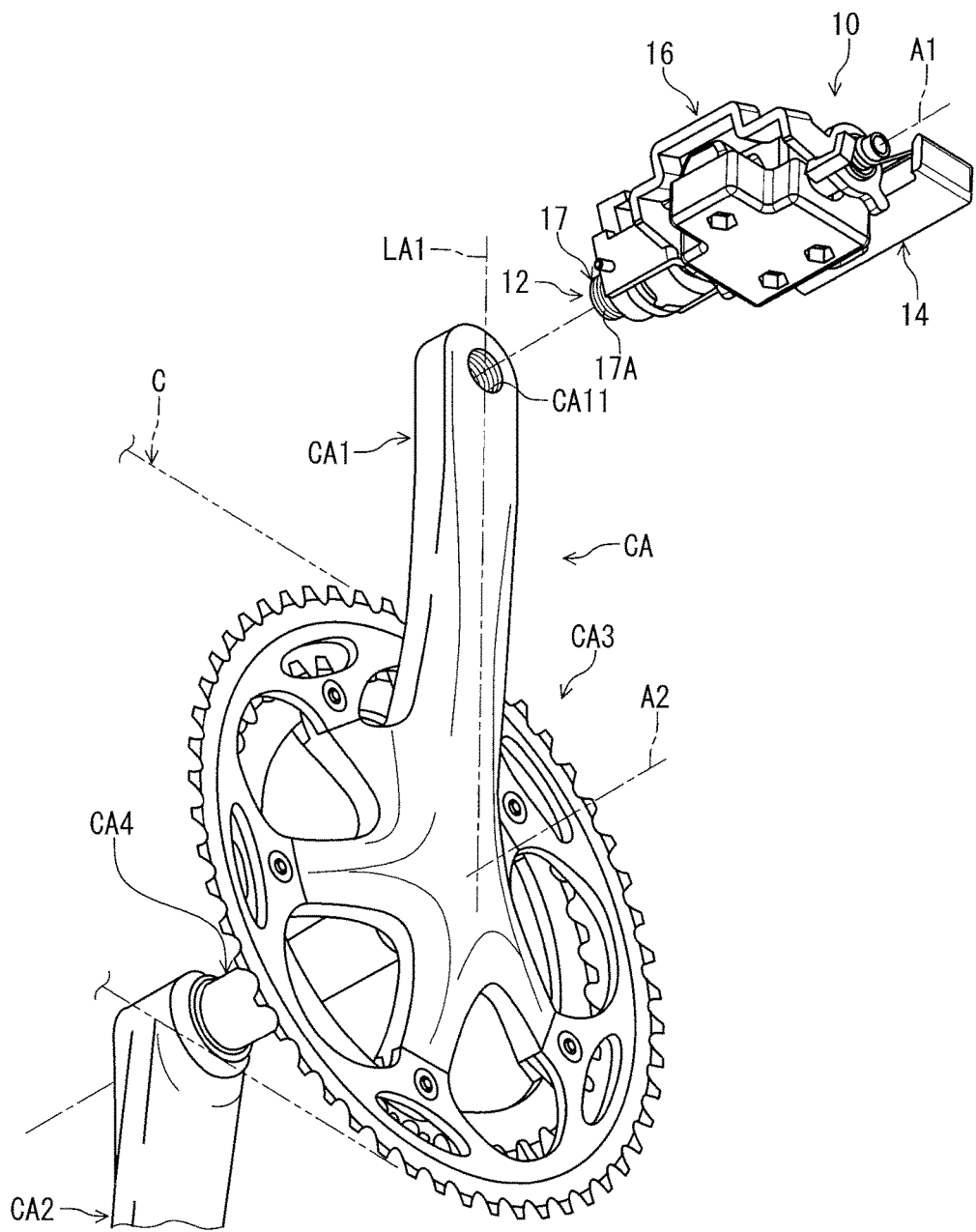
FIG. 1 is a perspective view of a bicycle crank assembly and a bicycle pedal in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle pedal 10 in accordance with a first embodiment comprises a pedal axle 12, a pedal body 14, and a movable member 16. The pedal axle 12 defines a rotational axis A1. The pedal axle 12 is configured to be secured to a crank arm CA1. The crank arm CA1 has a longitudinal axis LA1 extending from the rotational axis A1 to a crank rotational axis A2 of the crank arm CA1. The pedal axle 12 includes a first axle end 17 configured to be engaged with the crank arm CA1. The first axle end 17 includes an externally threaded part 17A threadedly engaged in a threaded hole CA11 of the crank arm CA1. The pedal axle 12 is secured to the crank arm CA1 to be stationary relative to the longitudinal axis LA1.

The bicycle crank assembly CA includes the crank arm CA1, a crank arm CA2, a sprocket assembly CA3, and a crank axle CA4. The crank arms CA1 and CA2 are secured to the crank axle CA4. The sprocket assembly CA3 is secured to the crank arm CA1 to engage with a bicycle chain C. The bicycle crank assembly CA is rotatably mounted on a bicycle frame (not shown) about the crank rotational axis A2. The bicycle pedal 10 is a right pedal, and the crank arm CA1 is a right crank arm. However, structures of the bicycle pedal 10 can be applied to a left pedal.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle pedal 10, should be interpreted relative to the bicycle equipped with the bicycle pedal 10 as used in an upright riding position on a horizontal surface.

Figure 2:
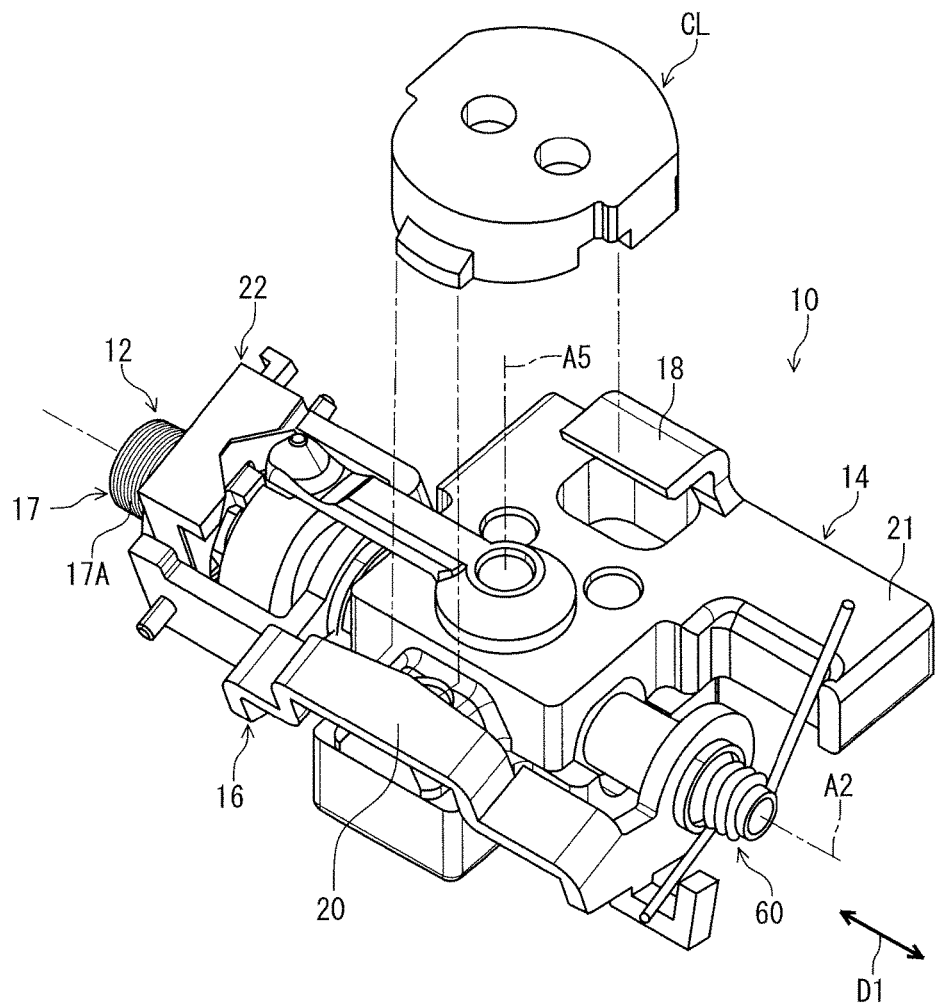
FIG. 2 is a perspective view of the bicycle pedal illustrated in FIG. 1, with a cleat.

As seen in FIG. 2, the pedal body 14 is rotatably coupled to the pedal axle 12 about the rotational axis A1. The movable member 16 is movable relative to the pedal body 14. In this embodiment, the movable member 16 is rotatably coupled to the pedal body 14 about the rotational axis A1. However, the movable member 16 can be movably coupled to the pedal axle 12.

The bicycle pedal 10 further comprises a cleat engagement part 18 coupled to the pedal body 14. The movable member 16 includes an additional cleat engagement part 20 spaced apart from the cleat engagement part 18. In this embodiment, the cleat engagement part 18 is secured to the pedal body 14. The cleat engagement part 18 is engageable with a cleat CL. The additional cleat engagement part 20 is engageable with the cleat CL. The cleat CL is secured to the bicycle pedal 10 in an engagement state where the cleat CL is in engagement with the cleat engagement part 18 and the additional cleat engagement part 20. The movable member 16 can include a friction part instead of or in additional to the additional cleat engagement part 20. In such an embodiment, the friction part increases a frictional force between the bicycle pedal 10 and a shoe of a rider. Examples of the friction part include a projection. For example, the friction part has a rest position and an actuated position. The friction part is configured to increase the friction force between the bicycle pedal 10 and the shoe in an actuated state where the friction part is at the actuated position in comparison with a rest state where the friction part is at the rest position.

Figure 3:
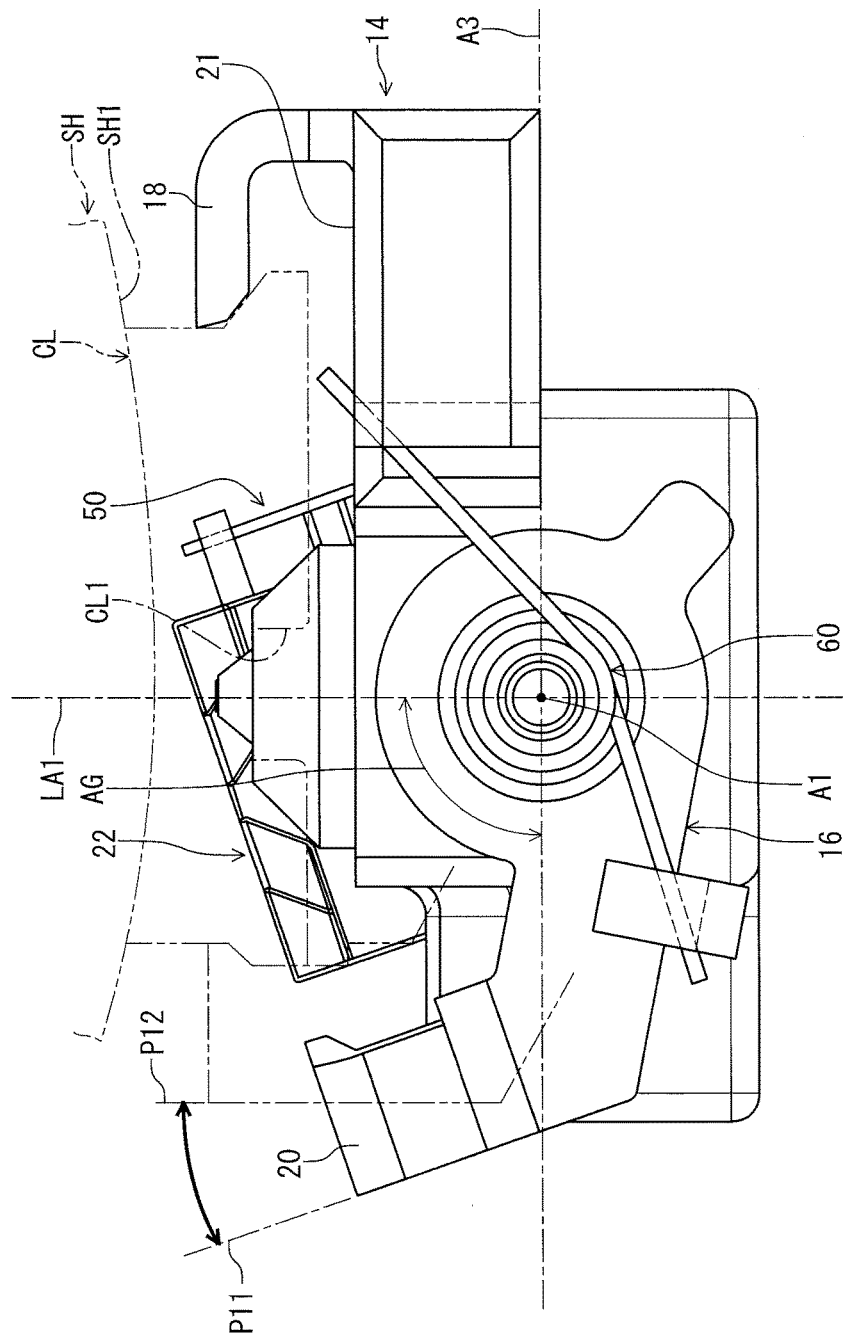
FIG. 3 is a side elevational view of the bicycle pedal illustrated in FIG. 1 (rest position).

As seen in FIG. 3, the movable member 16 is movable relative to the pedal body 14 from a rest position P11 toward an actuated position P12. In this embodiment, the movable member 16 is rotatable relative to the pedal body 14 about the rotational axis A1 from the rest position P11 to the actuated position P12. The cleat CL is detachable from or attachable to the bicycle pedal 10 in a rest state where the movable member 16 is at the rest position P11. The cleat CL is secured to the bicycle pedal 10 in an actuated state where the movable member 16 is at the actuated position P12. The cleat CL is secured to a sole SH1 of a shoe SH.

The pedal body 14 has a reference axis A3 perpendicular to the rotational axis A1 of the pedal axle 12. A relative angle AG is defined between the reference axis A3 and the longitudinal axis LA1 of the crank arm CA1 when viewed in an axial direction D1 (FIG. 2) parallel to the rotational axis A1 of the pedal axle 12. The pedal body 14 includes a tread surface 21 to face toward the cleat CL in a state where the cleat CL is secured to the bicycle pedal 10. The reference axis A3 is parallel to the tread surface 21.

Figure 6:
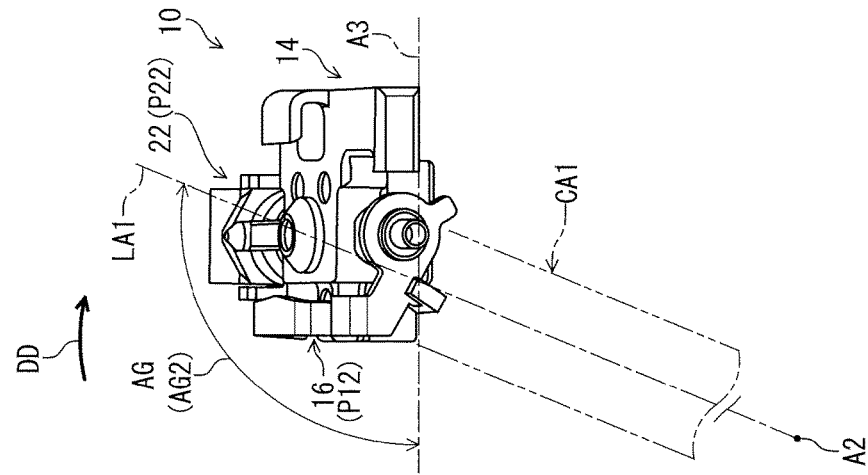
FIG. 6 is another perspective view of the bicycle pedal illustrated in FIG. 1, with the crank arm (second relative angle).
Figure 5:
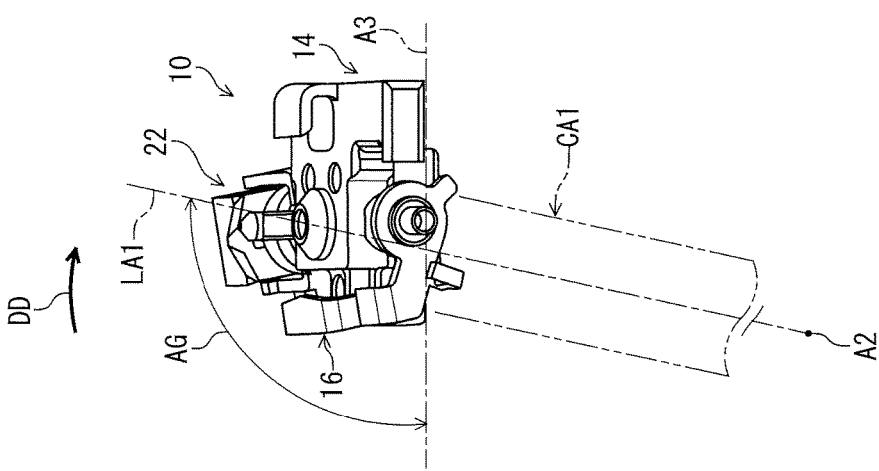
FIG. 5 is another perspective view of the bicycle pedal illustrated in FIG. 1, with the crank arm.
Figure 4:
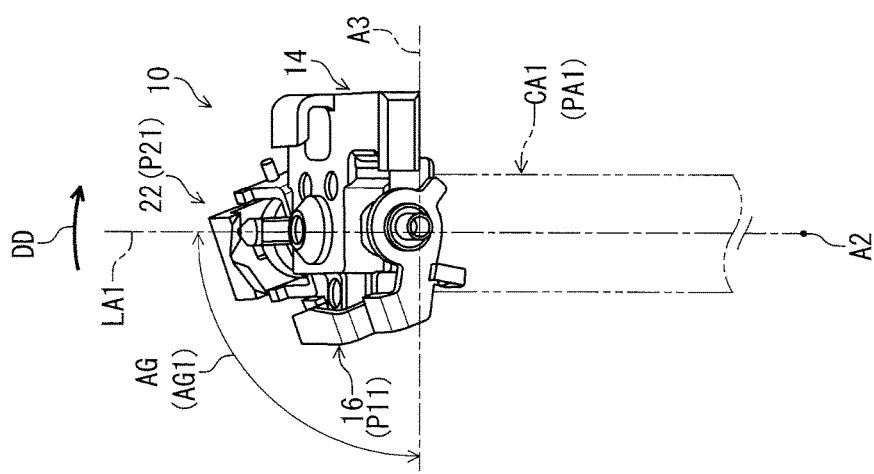
FIG. 4 is a perspective view of the bicycle pedal illustrated in FIG. 1, with a crank arm (first relative angle).

As seen in FIGS. 4 to 6, the relative angle AG increases when the crank arm CA1 is rotated from a first arm position PA1 (FIG. 4) in a driving rotational direction DD in which the crank arm CA1 is rotated during pedaling. The bicycle pedal 10 comprises an actuator 22. The actuator 22 is configured to move the movable member 16 from the rest position P11 toward the actuated position P12 in response to a first relative angle AG1. The first relative angle AG1 is defined between the reference axis A3 and the longitudinal axis LA1 of the crank arm CA1 when viewed in the axial direction D1 (FIG. 2) parallel to the rotational axis A1 of the pedal axle 12.

In this embodiment, the actuator 22 gradually moves the movable member 16 from the rest position P11 to the actuated position P12 while the relative angle AG increases from the first relative angle AG1 (FIG. 4) to a second relative angle AG2 (FIG. 6). A rotational position of the crank arm CA1 corresponding to the first relative angle AG1 is not limited to this embodiment. A rotational position of the crank arm CA1 corresponding to the second relative angle AG2 is not limited to this embodiment. Contrary to the illustrated embodiment, the relative angle AG can be defined to decrease when the crank arm CA1 is rotated from the rotational position depicted in FIG. 4 to the rotational position depicted in FIG. 6.

Figure 7:
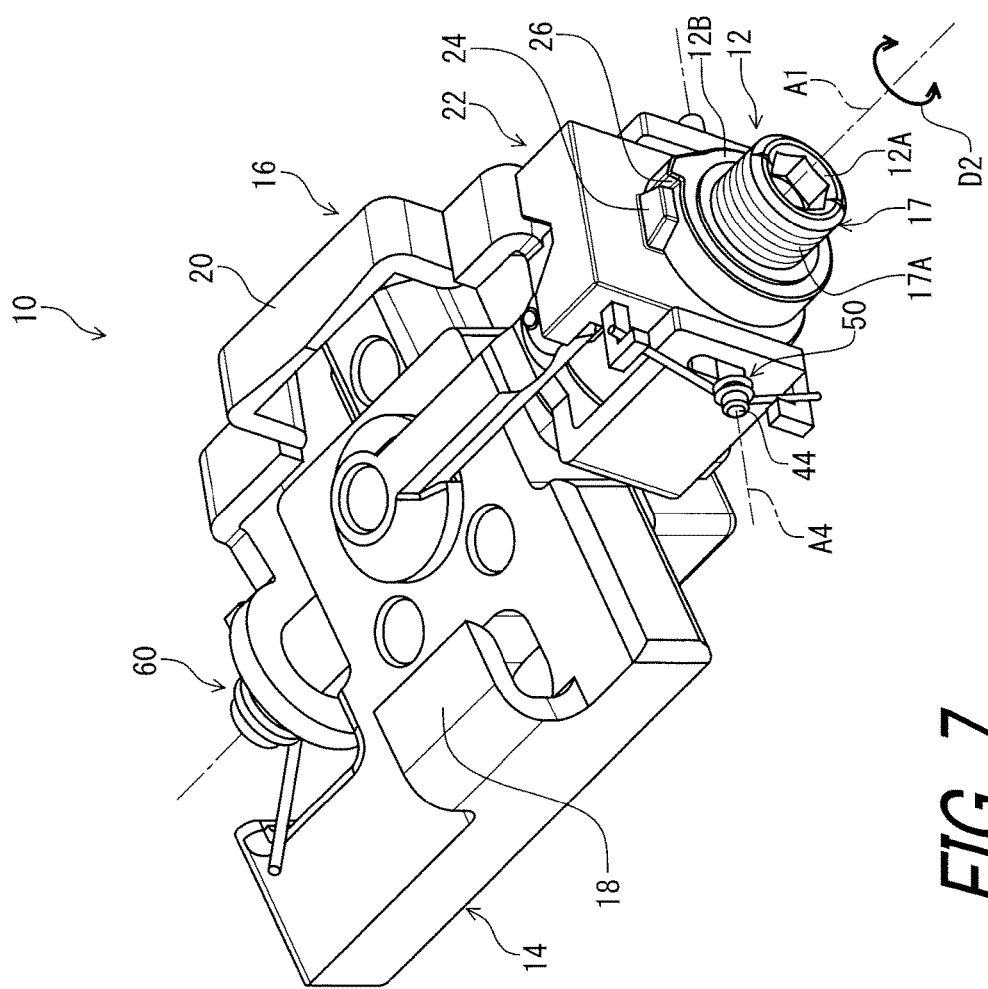
FIG. 7 is a perspective view of the bicycle pedal illustrated in FIG. 1.
Figure 8:
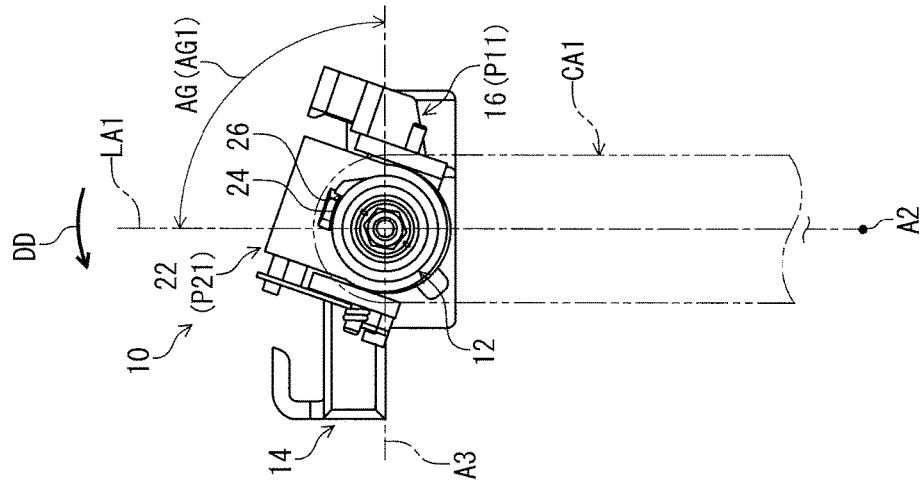
FIG. 8 is a side elevational view of the bicycle pedal illustrated in FIG. 1, with the crank arm (first relative angle).
Figure 9:
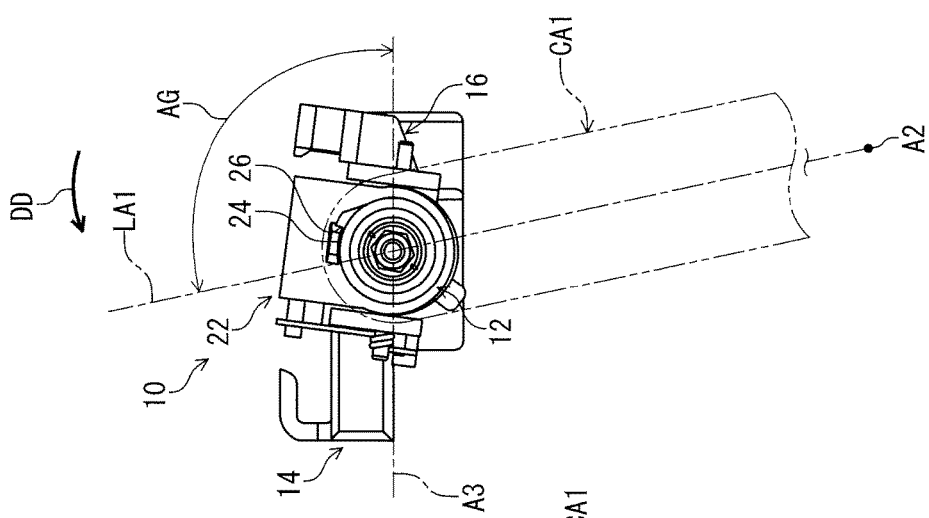
FIG. 9 is another side elevational view of the bicycle pedal illustrated in FIG. 1, with the crank arm.
Figure 10:
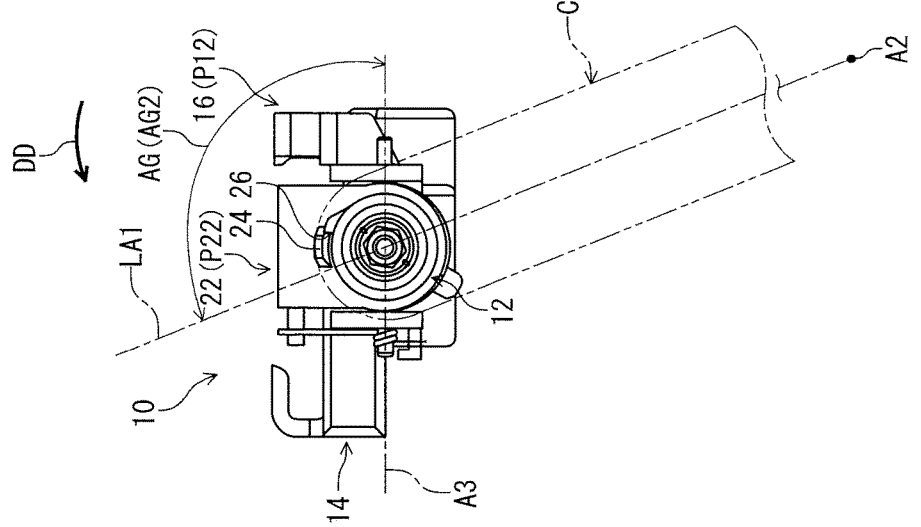
FIG. 10 is another side elevational view of the bicycle pedal illustrated in FIG. 1, with the crank arm (second relative angle).

As seen in FIG. 7, the actuator 22 is provided between the first axle end 17 and the pedal body 14 in the axial direction D1. The actuator 22 includes an actuation part 24. As seen in FIGS. 8 to 10, the movable member 16 and the actuator 22 are rotatable relative to the pedal axle 12 about the rotational axis A1. The actuation part 24 is engageable with at least one of the pedal axle 12 and the crank arm CA1 in response to a relative rotation between the pedal body 14 and the crank arm CA1 about the rotational axis A1. In this embodiment, the actuation part 24 is engageable with the pedal axle 12 in response to the relative rotation between the pedal body 14 and the crank arm CA1 about the rotational axis A1. The actuation part 24 is engageable with the first axle end 17 in response to the relative rotation between the pedal body 14 and the crank arm CA1 about the rotational axis A1. However, the actuation part 24 is engageable with the crank arm CA1 or both the pedal axle 12 and the crank arm CA1 in response to the relative rotation between the pedal body 14 and the crank arm CA1 about the rotational axis A1.

As seen in FIG. 7, the first axle end 17 includes a first contact surface 26. The first contact surface 26 faces in a circumferential direction D2 with respect to the rotational axis A1. As seen in FIGS. 8 to 10, the actuation part 24 is contactable with the first contact surface 26 in response to the relative rotation between the pedal body 14 and the crank arm CA1 about the rotational axis A1. However, the actuation part 24 can be configured to be engageable with the pedal axle 12 or both the pedal axle 12 and the crank arm CA1 in response to the relative rotation between the pedal body 14 and the crank arm CA1 about the rotational axis A1. The actuation part 24 can be configured to be engageable with another part of the pedal axle 12 in response to the relative rotation between the pedal body 14 and the crank arm CA1 about the rotational axis A1.

Figure 11:
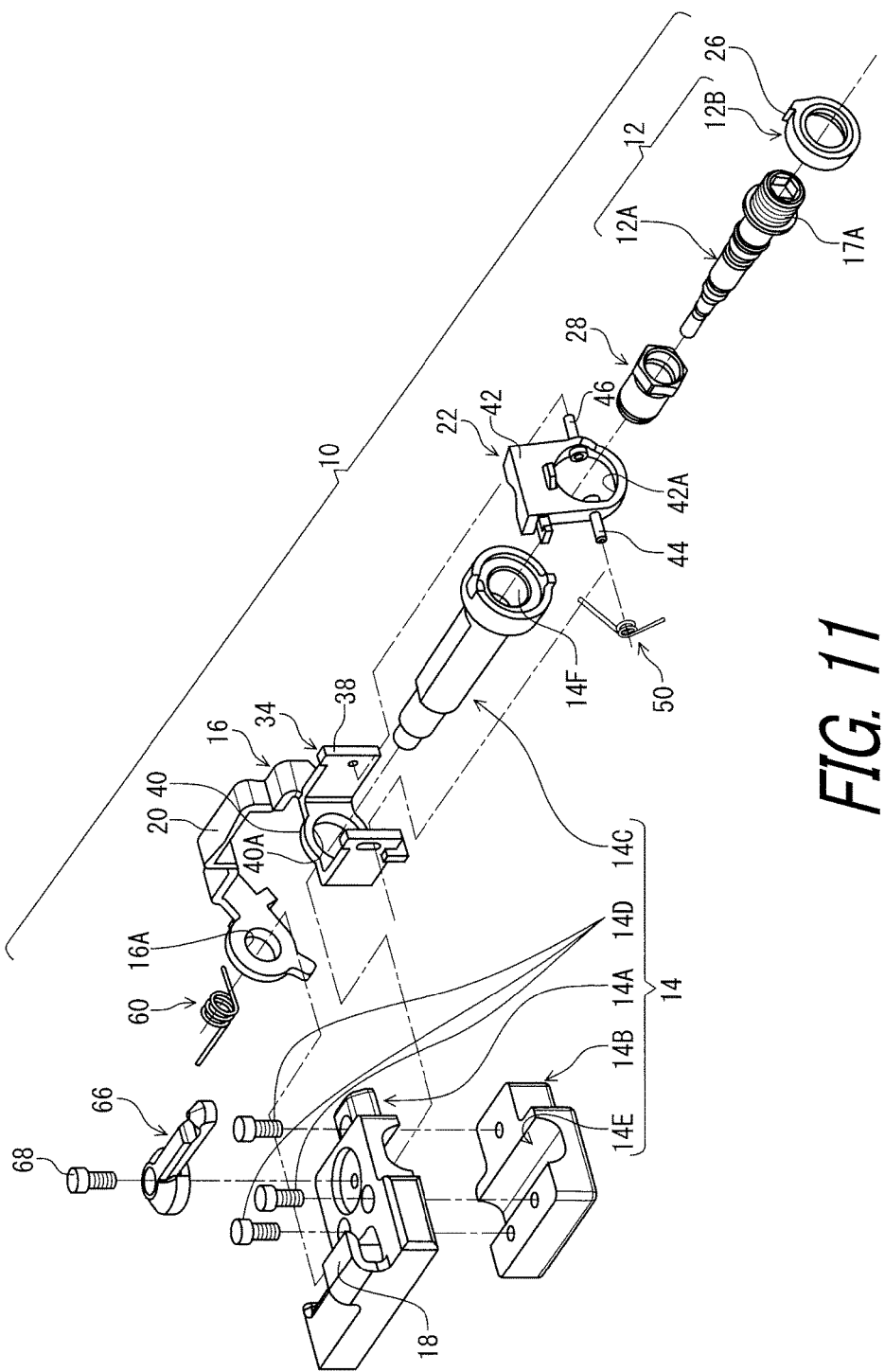
FIG. 11 is an exploded perspective view of the bicycle pedal illustrated in FIG. 1.

As seen in FIG. 11, the pedal axle 12 includes an axle body 12A and a contact member 12B. The axle body 12A includes the externally threaded part 17A. The contact member 12B is a separate member from the axle body 12A and is attached to the axle body 12A. The contact member 12B has an annular shape. The contact member 12B includes the first contact surface 26. However, the contact member 12B is not limited to this embodiment. The contact member 12B can be integrally provided with the axle body 12A as a one-piece unitary member. The contact member 12B can be attached to the crank arm CA1 (FIG. 1).

The pedal body 14 includes a first body 14A, a second body 14B, an axle support 14C, and fasteners 14D. The first body 14A is secured to the second body 14B with the fasteners 14D. The first body 14A and the second body 14B provides an attachment hole 14E. The axle support 14C is secured in the attachment hole 14E to rotate along with the first and second bodies 14A and 14B relative to the pedal axle 12 about the rotational axis A1. The axle support 14C includes a support hole 14F. The pedal axle 12 is rotatably provided in the axle support 14C about the rotational axis A1. The pedal axle 12 is rotatably attached to the axle support 14C with an axle fastener 28.

Figure 12:
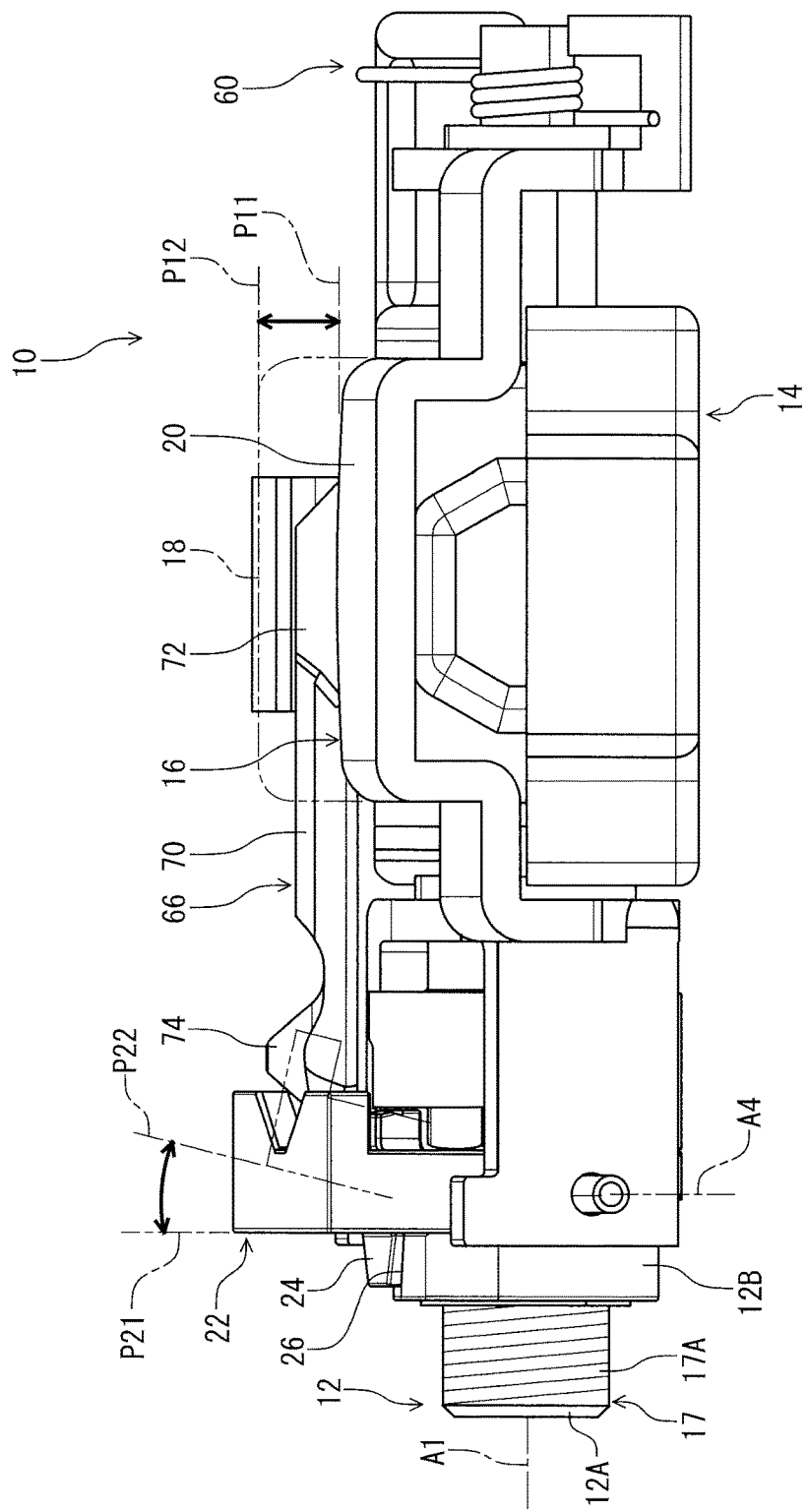
FIG. 12 is a rear view of the bicycle pedal illustrated in FIG. 1 (rest position).

As seen in FIG. 12, the actuator 22 is movable relative to the pedal axle 12 from a non-actuation position P21 toward an actuation position P22 to move the movable member 16 relative to the pedal axle 12 from the rest position P11 toward the actuated position P12. In this embodiment, the non-actuation position P21 of the actuator 22 corresponds to the rest position P11 of the movable member 16. The actuation position P22 of the actuator 22 corresponds to the actuated position P12 of the movable member 16.

As seen in FIGS. 8 to 10, the actuation part 24 is engageable with the at least one of the pedal axle 12 and the crank arm CA1 in response to the relative rotation between the pedal body 14 and the crank arm CA1 about the rotational axis A1 to move the actuator 22 from the non-actuation position P21 toward the actuation position P22. In this embodiment, the actuation part 24 is engageable with the pedal axle 12 in response to the relative rotation between the pedal body 14 and the crank arm CA1 about the rotational axis A1 to move the actuator 22 from the non-actuation position P21 toward the actuation position P22. However, the actuation part 24 can be configured to be engageable with the crank arm CA1 or both the pedal axle 12 and the crank arm CA1 in response to the relative rotation between the pedal body 14 and the crank arm CA1 about the rotational axis A1 to move the actuator 22 from the non-actuation position P21 toward the actuation position P22.

Figure 13:
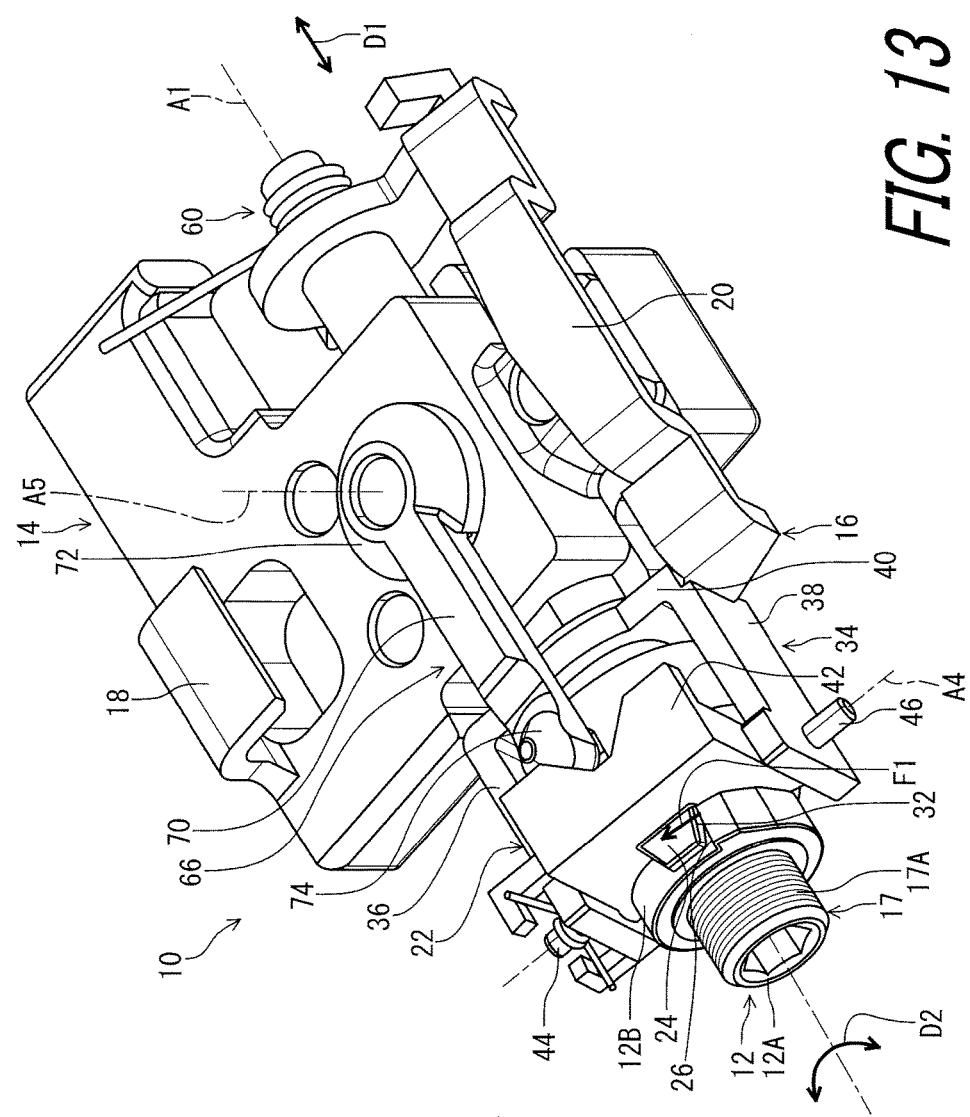
FIG. 13 is a perspective view of the bicycle pedal illustrated in FIG. 1.

As seen in FIG. 13, the actuation part 24 includes a second contact surface 32. The second contact surface 32 faces in the circumferential direction D2 to receive an actuation force F1 from the first contact surface 26. The second contact surface 32 is in contact with the first contact surface 26 in a non-actuation state where the actuator 22 is at the non-actuation position P21.

Figure 14:
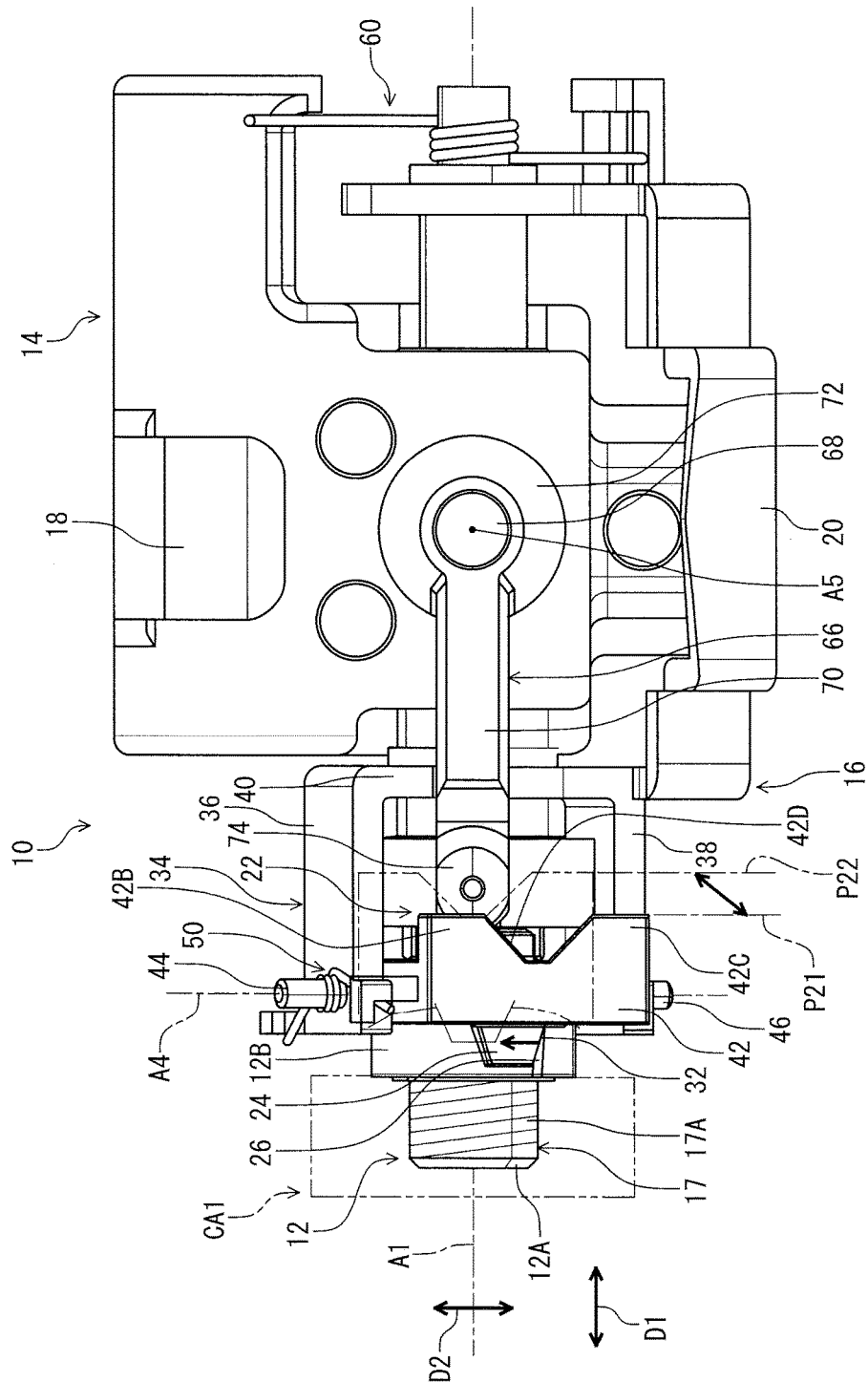
FIG. 14 is a plane view of the bicycle pedal illustrated in FIG. 1 (rest position).

As seen in FIG. 14, the actuator 22 is movable relative to the pedal axle 12 from the non-actuation position P21 toward the actuation position P22 to move away from the crank arm CA1 in the axial direction D1. The actuator 22 is movable relative to the pedal axle 12 from the non-actuation position P21 toward the actuation position P22 to approach the pedal body 14 in the axial direction D1.

The movable member 16 includes a coupling part 34 coupled to the actuator 22. The actuator 22 is movably coupled to the coupling part 34. The actuator 22 is pivotally coupled to the coupling part 34 about a pivot axis A4 non-parallel to the rotational axis A1 of the pedal axle 12. In this embodiment, the pivot axis A4 is perpendicular to the rotational axis A1. However, a positional relationship between the pivot axis and the rotational axis A1 is not limited to this embodiment.

The coupling part 34 includes a first support 36, a second support 38, and an intermediate support 40. The pedal axle 12 and the actuator 22 are provided between the first support 36 and the second support 38. The intermediate support 40 couples the first support 36 and the second support 38. The first support 36 and the second support 38 extend from the intermediate support 40 in the axial direction D1.

As seen in FIG. 13, the actuator 22 includes an actuator body 42, a first pivot pin 44, and a second pivot pin 46. The actuation part 24 extends from the actuator body 42 in the axial direction D1. The first pivot pin 44 extends from the actuator body 42 in a direction different from the axial direction D1. The second pivot pin 46 extends from the actuator body 42 in a direction different from the axial direction D1.

Figure 15:
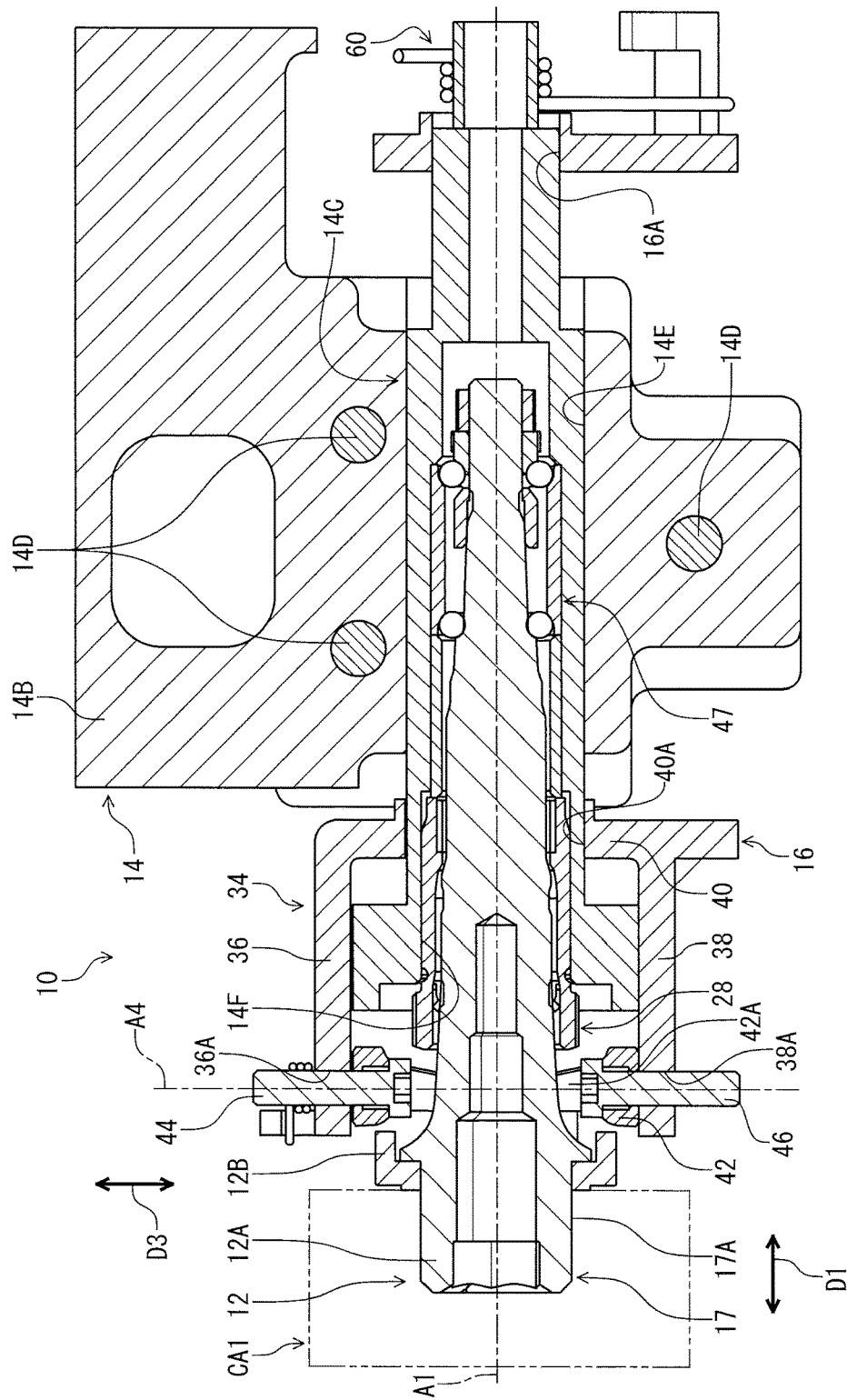
FIG. 15 is a cross-sectional view of the bicycle pedal taken along line XV-XV of FIG. 16.

As seen in FIG. 15, the first pivot pin 44 extends from the actuator body 42 in a direction D3 perpendicular to the axial direction D1. The second pivot pin 46 extends from the actuator body 42 in the direction D3. The first pivot pin 44 is a separate member from the actuator body 42 and the second pivot pin 46. The second pivot pin 46 is a separate member from the actuator body 42. The first pivot pin 44 and the second pivot pin 46 are secured to the actuator body 42. However, at least one of the first pivot pin 44 and the second pivot pin 46 can be integrally provided with the actuator body 42 as a one-piece unitary member. The first support 36 includes a first pivot hole 36A. The second support 38 includes a second pivot hole 38A. The first pivot pin 44 extends through the first pivot hole 36A. The second pivot pin 46 extends through the second pivot hole 38A.

The intermediate support 40 includes a support hole 40A. The actuator body 42 includes an opening 42A. The movable member 16 includes an additional support hole 16A. The axle support 14C extends through the support hole 40A and the additional support hole 16A. The pedal axle 12 extends through the opening 42A.

The bicycle pedal 10 comprises a bearing structure 47. The bearing structure 47 is provided in the support hole 14F of the axle support 14C to rotatably support the pedal body 14 relative to the pedal axle 12 about the rotational axis A1. The axle fastener 28 and the bearing structure 47 prevents the pedal axle 12 from unintentionally removed from the pedal body 14.

Figure 16:
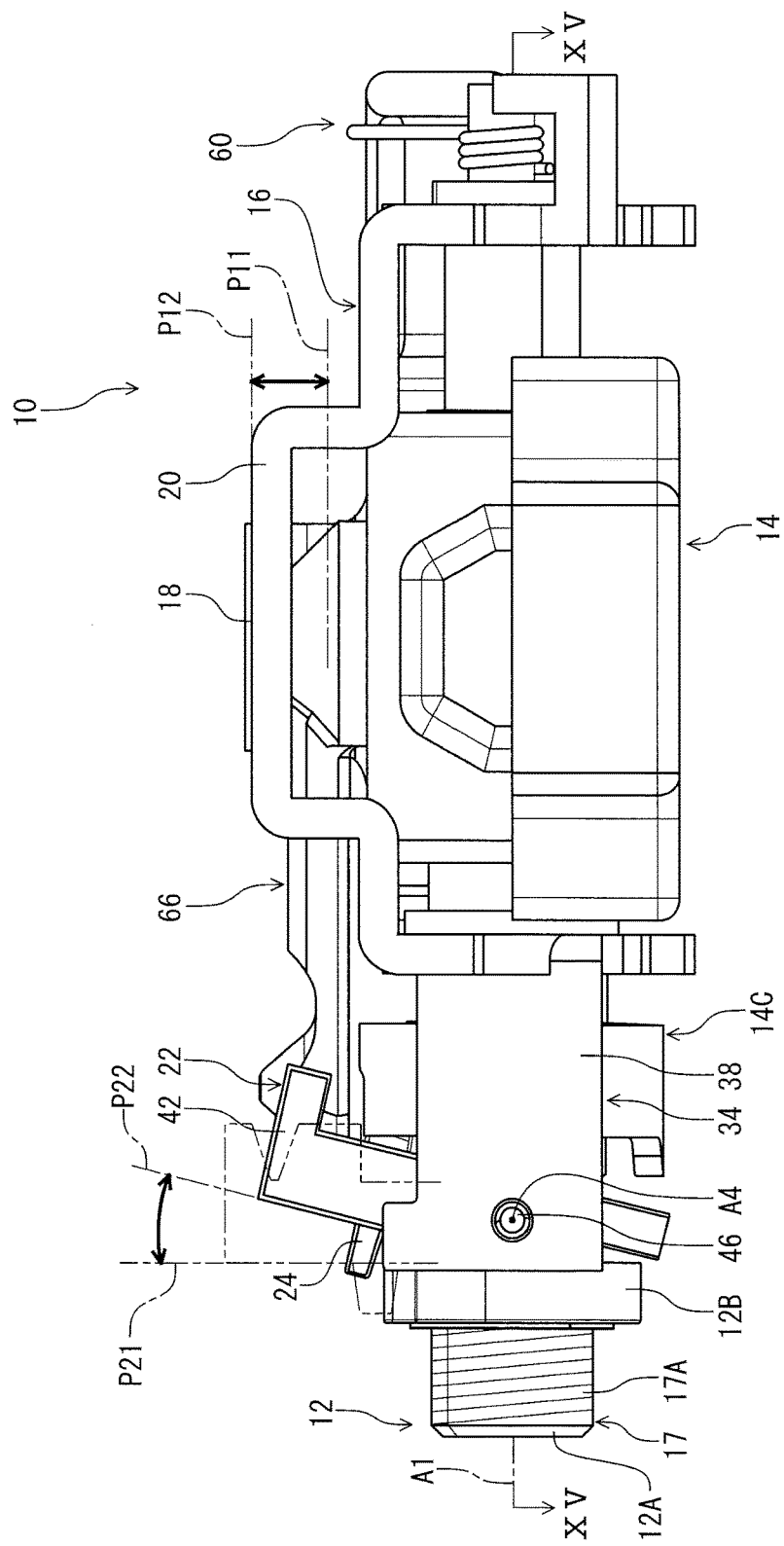
FIG. 16 is a rear view of the bicycle pedal illustrated in FIG. 1 (actuated position).
Figure 17:
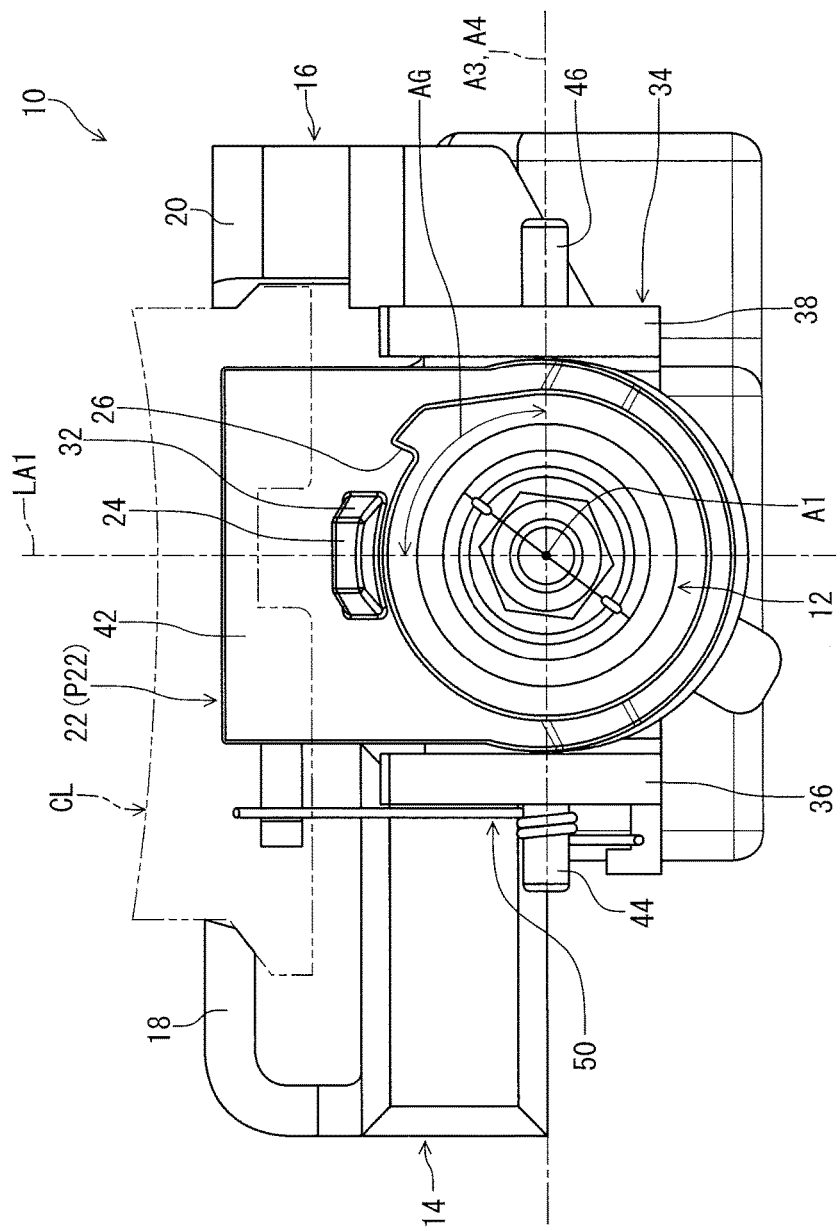
FIG. 17 is a side elevational view of the bicycle pedal illustrated in FIG. 1 (actuated position).

As seen in FIGS. 16 and 17, the actuation part 24 is movable relative to the at least one of the pedal axle 12 and the crank arm CA1 (FIGS. 8 to 10) without engaging with the at least one of the pedal axle 12 and the crank arm CA1 in an actuation state where the actuator 22 is at the actuation position P22. The actuation part 24 is rotatable relative to the pedal axle 12 about the rotational axis A1 without engaging with the pedal axle 12 in the actuation state where the actuator 22 is at the actuation position P22 during pedaling. In this embodiment, the actuation part 24 is provided farther from the rotational axis A1 than the first contact surface 26 of the pedal axle 12 in the actuation state where the actuator 22 is at the actuation position P22. Therefore, the actuation part 24 at the actuation position P22 does not interfere with the at least one of the pedal axle 12 and the crank arm CA1 during pedaling.

Figure 18:
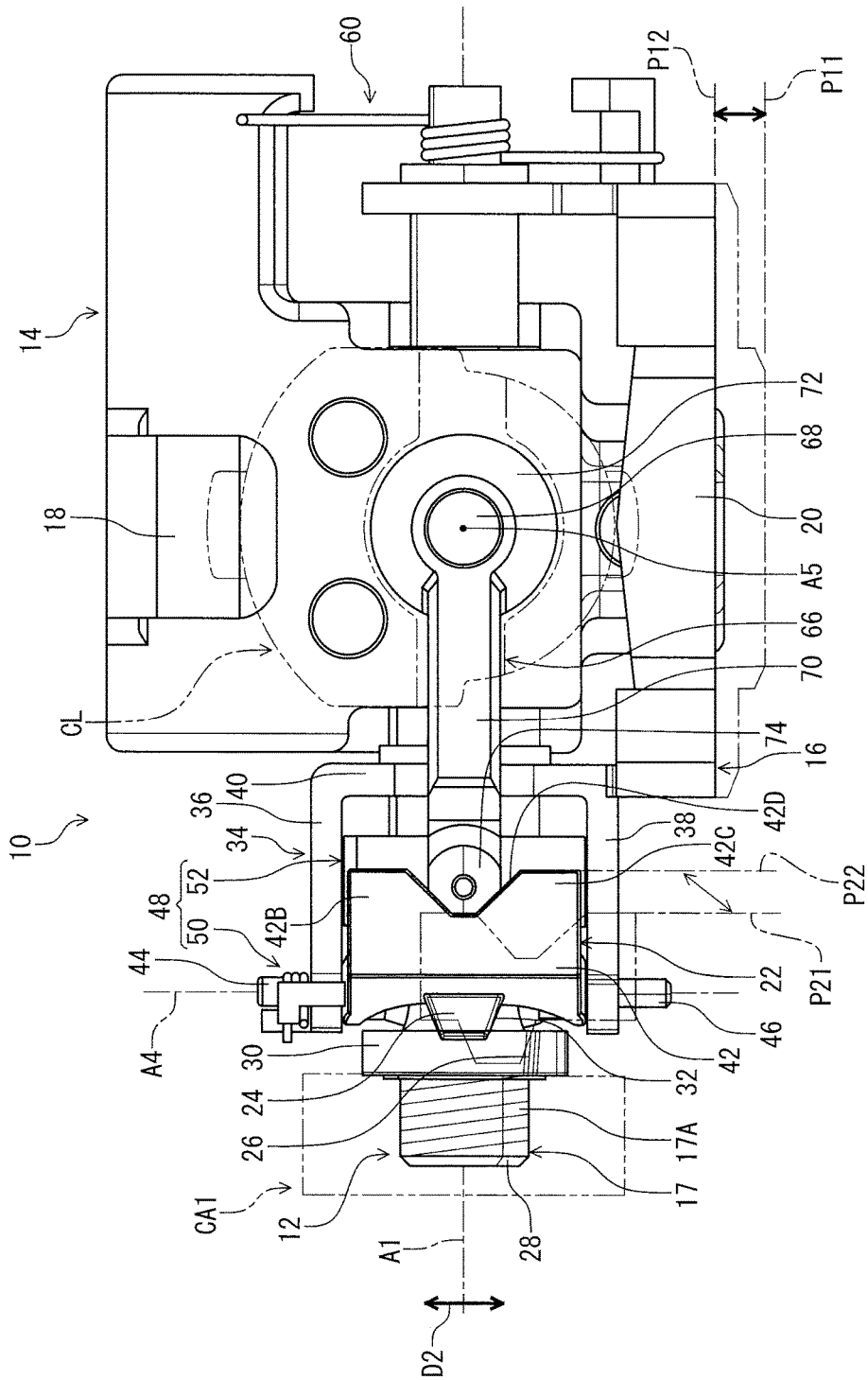
FIG. 18 is a plan view of the bicycle pedal illustrated in FIG. 1 (actuated position).

As seen in FIGS. 14 and 18, the bicycle pedal 10 further comprises a positioning structure 48 configured to position the actuator 22 at the actuation position P22. The positioning structure 48 includes an actuation-position biasing member 50 to bias the actuator 22 toward the actuation position P22. In this embodiment, the actuation-position biasing member 50 is attached to the first pivot pin 44. The actuation-position biasing member 50 includes a torsion coil spring. However, the actuation-position biasing member 50 can include other type of biasing element.

Figure 19:
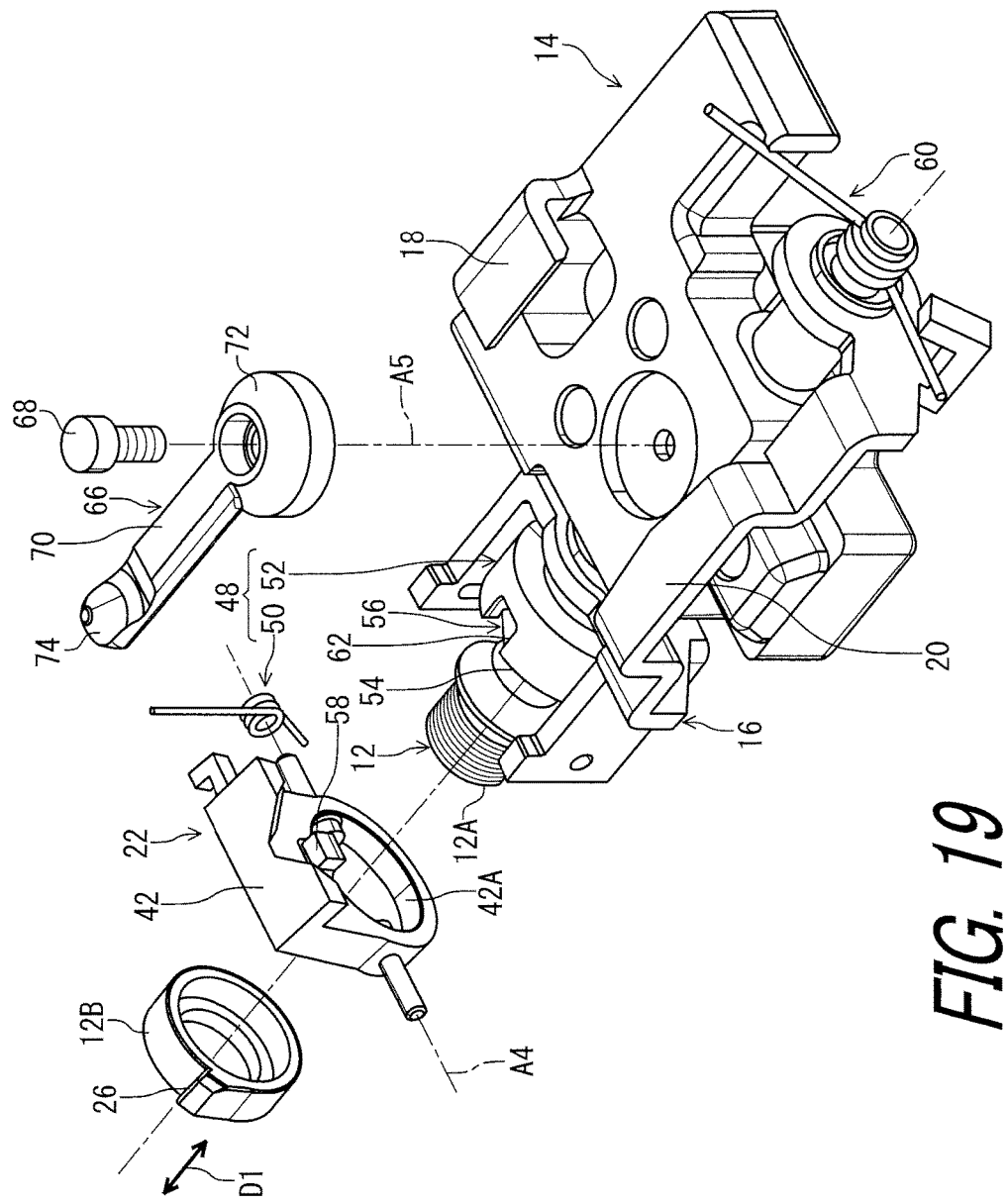
FIG. 19 is an exploded perspective view of the bicycle pedal illustrated in FIG. 1.
Figure 20:
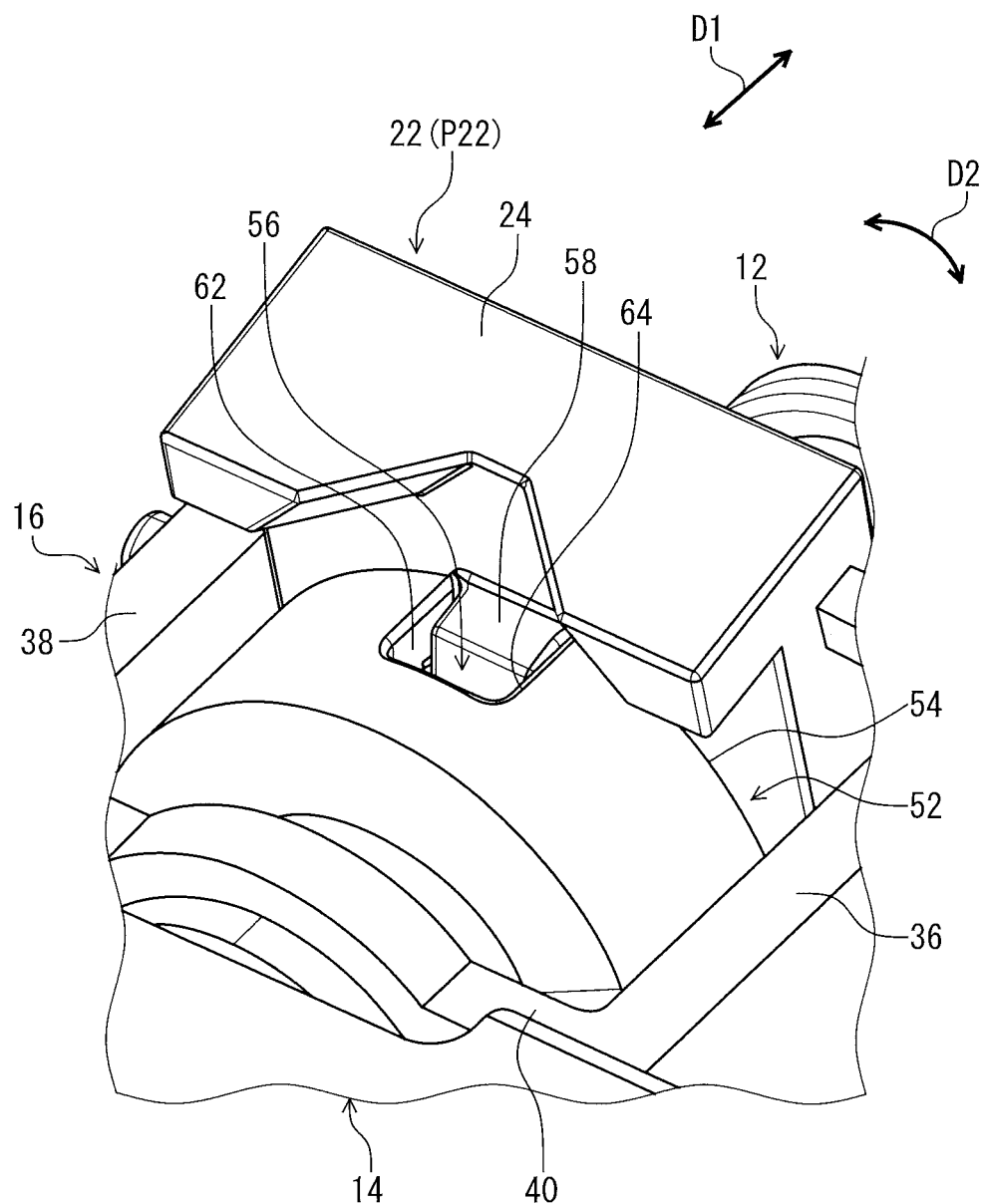
FIG. 20 is a partial perspective view of the bicycle pedal illustrated in FIG. 1, without a release structure (actuation position).

As seen in FIGS. 19 and 20, the positioning structure 48 includes a positioning part 52. The positioning part 52 is configured to restrict a relative movement between the pedal body 14 and the actuator 22 in the actuation state where the actuator 22 is at the actuation position P22. The positioning part 52 is configured to position the actuator 22 at the non-actuation position P21.

In this embodiment, the positioning part 52 includes a positioning surface 54. The positioning surface 54 is provided at an end of the axle support 14C of the pedal body 14. The positioning surface 54 faces in the axial direction D1. The positioning surface 54 is in contact with the actuator body 42 to position the actuator 22 at the actuation position P22 in the axial direction D1. The actuation-position biasing member 50 presses the actuator body 42 against the positioning surface 54 in the actuation state of the actuator 22.

The positioning part 52 includes a recess 56. The recess 56 extends from the positioning surface 54 in the axial direction D1 and is provided on the pedal body 14 (the positioning surface 54). The actuator 22 includes a restriction projection 58. The restriction projection 58 extends from the actuator body 42 in the axial direction D1. The restriction projection 58 is provided in the recess 56 in the actuation state of the actuator 22.

As seen in FIG. 18, the bicycle pedal 10 further comprises a rest-position biasing member 60 to bias the movable member 16 toward the rest position P11. In this embodiment, the rest-position biasing member 60 is attached to the pedal body 14. The rest-position biasing member 60 includes a torsion coil spring. However, the rest-position biasing member 60 can include other type of biasing element.

As seen in FIG. 20, the positioning part 52 includes a restriction surface 62 and an additional surface 64. The restriction surface 62 is provided on the pedal body 14 and faces in the circumferential direction D2. The restriction projection 58 is contactable with the restriction surface 62 in the actuation state of the actuator 22. The additional surface 64 is spaced apart from the restriction surface 62 to provide the recess 56 between the restriction surface 62 and the additional surface 64 in the circumferential direction D2. The restriction projection 58 is in contact with the positioning surface 54 to position the actuator 22 at the actuation position P22 in the circumferential direction D2. The rest-position biasing member 60 presses the actuator 22 against the restriction surface 62 in the actuation state of the actuator 22.

Figure 21:
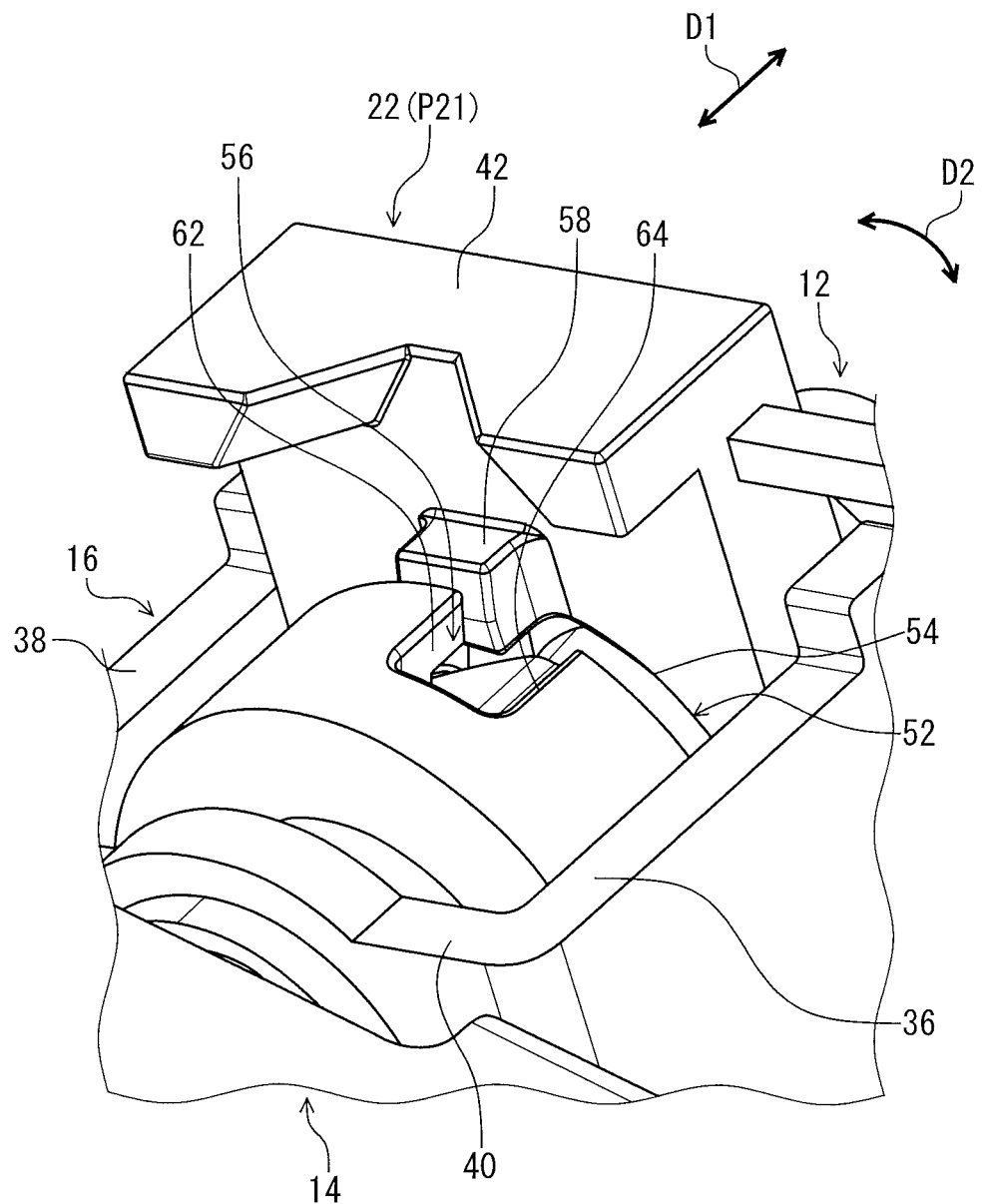
FIG. 21 is a partial perspective view of the bicycle pedal illustrated in FIG. 1, without the release structure (non-actuation position).

As seen in FIG. 21, the positioning surface 54 is in contact with the restriction projection 58 to position the actuator 22 at the non-actuation position P21 in the axial direction D1. The actuation-position biasing member 50 presses the restriction projection 58 against the positioning surface 54 in the non-actuation state of the actuator 22.

As seen in FIGS. 18 and 19, the bicycle pedal 10 further comprises a release structure 66. The release structure 66 is configured to move the actuator 22 from the actuation position P22 to the non-actuation position P21. The release structure 66 is movably coupled to the pedal body 14. In this embodiment, the release structure 66 is pivotally coupled to the pedal body 14 about a release pivot axis A5. The release structure 66 is pivotally coupled to the pedal body 14 with a pivot pin 68.

The release structure 66 includes an engagement portion 70. The engagement portion 70 is engageable with the cleat CL to move the actuator 22 from the actuation position P22 to the non-actuation position P21 in response to a relative movement between the cleat CL and the pedal body 14. The engagement portion 70 is engageable in a groove CL1 (FIG. 3) of the cleat CL. The engagement portion 70 is pivoted relative to the pedal body 14 about the release pivot axis A5 in response to a pivotal movement of the cleat CL secured to the bicycle pedal 10.

The release structure 66 includes a base part 72 and a release part 74. The base part 72 is pivotally coupled to the pedal body 14 with the pivot pin 68. The engagement portion 70 extends from the base part 72 toward the actuator 22. The release part 74 is provided at an end of the engagement portion 70. The release part 74 is engageable with the actuator 22. The actuator body 42 includes a first receiving part 42B and a second receiving part 42C. The actuator body 42 includes an engagement recess 42D provided between the first receiving part 42B and the second receiving part 42C. The release part 74 is provided in the engagement recess 42D in the actuation state where the actuator 22 is at the actuation position P22.

Figure 24:
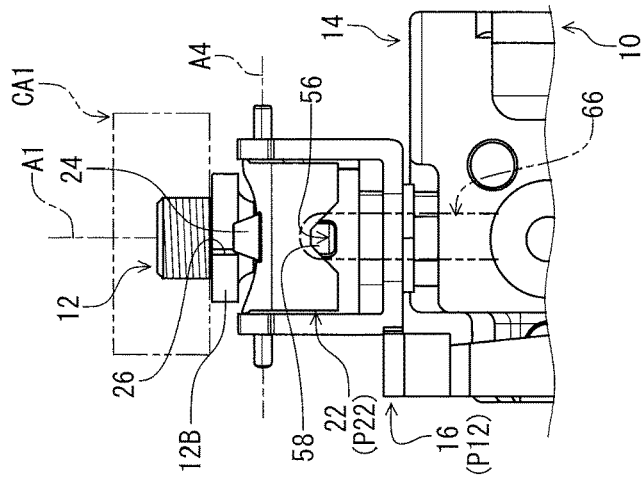
FIG. 24 is a partial plan view of the bicycle pedal illustrated in FIG. 1 (actuation position).
Figure 23:
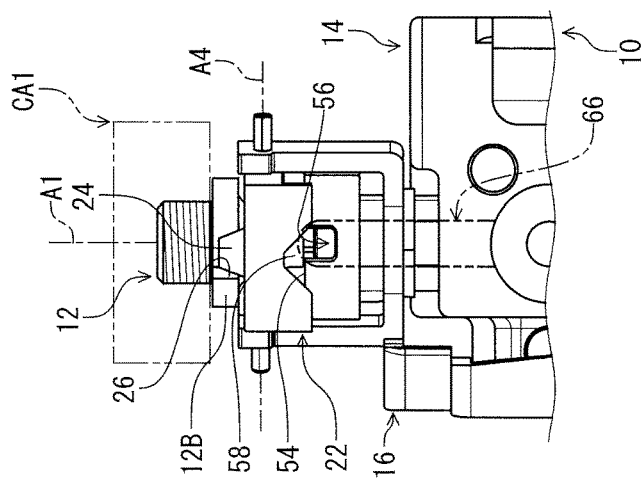
FIG. 23 is a partial plan view of the bicycle pedal illustrated in FIG. 1.
Figure 22:
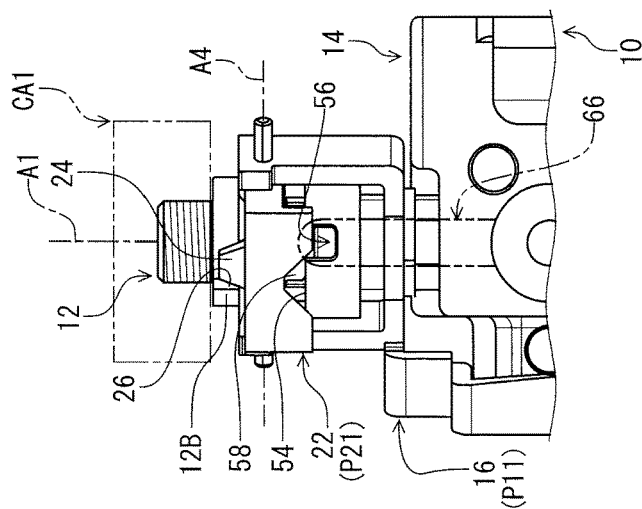
FIG. 22 is a partial plan view of the bicycle pedal illustrated in FIG. 1 (non-actuation position).

A step-in operation of the bicycle pedal 10 will be described in detail below referring to FIGS. 4 to 6 and 22 to 24. FIG. 22 corresponds to FIG. 4. FIG. 23 corresponds to FIG. 5. FIG. 24 corresponds to FIG. 6.

As seen in FIGS. 4 to 6, in the step-in operation, the crank arm CA1 is rotated from the first arm position PA1 in the driving rotational direction DD in a state where the cleat CL is engaged with the cleat engagement part 18 (e.g., FIG. 3). The crank arm CA1 and the pedal axle 12 are rotated relative to the pedal body 14 while the crank arm CA1 is rotated from the first arm position PA1 in the driving rotational direction DD.

As seen in FIGS. 22 to 24, the actuator 22 moves the movable member 16 from the rest position P11 toward the actuated position P12 in response to the first relative angle AG1 (FIG. 4). Specifically, the first contact surface 26 of the pedal axle 12 presses the actuation part 24 in the circumferential direction D2 in response to a relative rotation between the pedal body 14 and the crank arm CA1 (the pedal axle 12). This rotates the actuator 22 relative to the pedal body 14 about the rotational axis A1, moving the movable member 16 from the rest position P11 toward the actuated position P12.

As seen in FIGS. 22 and 23, the restriction projection 58 slides with the positioning surface 54 of the pedal body 14 when the actuator 22 is rotated relative to the pedal body 14 about the rotational axis A1. As seen in FIG. 24, the restriction projection 58 is inserted into the recess 56 of the pedal body 14 when the relative angle AG reaches the second relative angle AG2. Thus, the movable member 16 and the actuator 22 are respectively positioned at the actuated position P12 and the actuation position P22. Accordingly, the cleat engagement part 18 and the additional cleat engagement part 20 are engaged with the cleat CL (FIG. 3) to hold the cleat CL.

Figure 27:
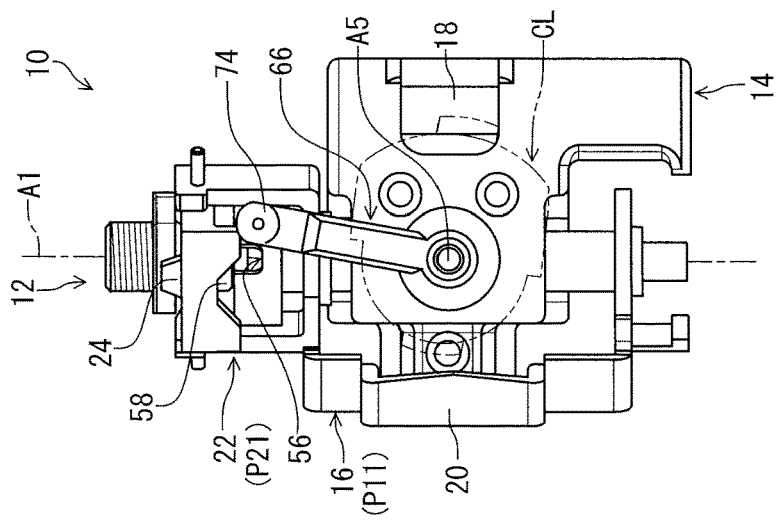
FIG. 27 is a partial plan view of the bicycle pedal illustrated in FIG. 1 (non-actuation position).
Figure 26:
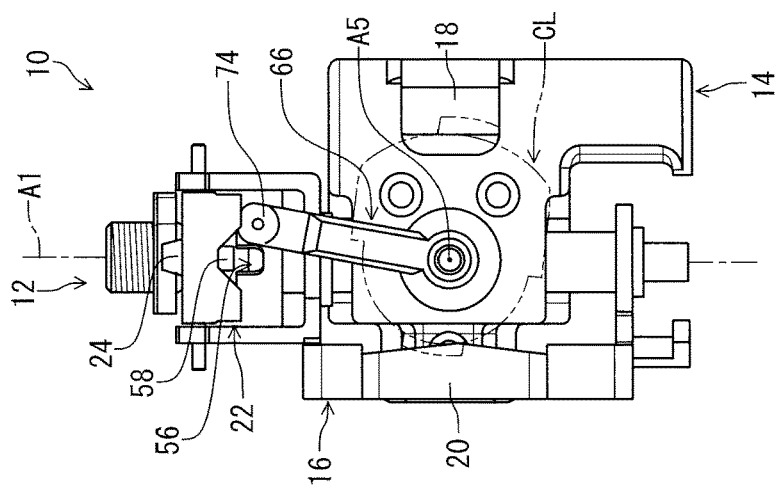
FIG. 26 is a partial plan view of the bicycle pedal illustrated in FIG. 1.

A step-out operation of the bicycle pedal 10 will be described in detail below referring to FIGS. 25 to 27.

Figure 25:
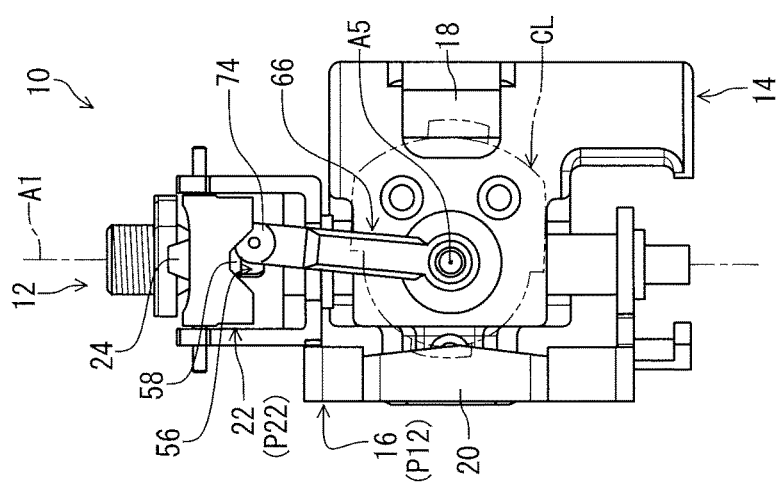
FIG. 25 is a partial plan view of the bicycle pedal illustrated in FIG. 1 (actuation position).

As seen in FIG. 25, the release structure 66 is pivoted relative to the pedal body 14 about the release pivot axis A5 when the cleat CL is moved relative to the pedal body 14 in response to a twist or a slide of a shoe (not shown). The release part 74 of the release structure 66 moves the actuator 22 away from the pedal body 14 against a biasing force of the actuation-position biasing member 50 in response to a pivotal movement of the release structure 66. As seen in FIG. 26, this releases an engagement between the restriction projection 58 and the restriction surface 62 of the positioning part 52. As seen in FIG. 27, the movable member 16 and the actuator 22 are rotated relative to the pedal body 14 because of a biasing force of the rest-position biasing member 60. This respectively returns the movable member 16 and the actuator 22 to the rest position P11 and the actuation position P22. The release structure 66 can be pivoted in a direction opposite to a pivot direction depicted in FIGS. 25 to 27.

The release structure 66 can be omitted from the bicycle pedal 10. In such an embodiment, the actuator 22 is directly contactable with the cleat CL to move relative to the pedal body 14 in response to a movement of the cleat CL.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
   a pedal axle defining a rotational axis, the pedal axle being configured to be secured to a crank arm having a longitudinal axis extending from the rotational axis to a crank rotational axis of the crank arm;
   a pedal body rotatably coupled to the pedal axle about the rotational axis, the pedal body having a reference axis perpendicular to the rotational axis of the pedal axle;
   a movable member movable relative to the pedal body from a rest position toward an actuated position; and
   an actuator configured to move the movable member from the rest position toward the actuated position in response to a change in a first relative angle defined between the reference axis and the longitudinal axis of the crank arm when viewed in an axial direction parallel to the rotational axis of the pedal axle.

2. The bicycle pedal according to claim 1, further comprising
   a cleat engagement part coupled to the pedal body, wherein
   the movable member includes an additional cleat engagement part spaced apart from the cleat engagement part.

3. The bicycle pedal according to claim 1, wherein
   the actuator includes an actuation part engageable with at least one of the pedal axle and the crank arm in response to a relative rotation between the pedal body and the crank arm about the rotational axis.

4. The bicycle pedal according to claim 3, wherein
   the pedal axle includes a first axle end configured to be engaged with the crank arm, and
   the actuation part is engageable with the first axle end in response to the relative rotation between the pedal body and the crank arm about the rotational axis.

5. The bicycle pedal according to claim 3, wherein
   the actuator is movable relative to the pedal axle from a non-actuation position toward an actuation position to move the movable member relative to the pedal axle from the rest position toward the actuated position.

6. The bicycle pedal according to claim 5, wherein
   the actuation part is engageable with the at least one of the pedal axle and the crank arm in response to the relative rotation between the pedal body and the crank arm about the rotational axis to move the actuator from the non-actuation position toward the actuation position.

7. The bicycle pedal according to claim 5, wherein
   the actuator is movable relative to the pedal axle from the non-actuation position toward the actuation position to move away from the crank arm in the axial direction.

8. The bicycle pedal according to claim 5, wherein
   the actuation part is movable relative to the at least one of the pedal axle and the crank arm without engaging with the at least one of the pedal axle and the crank arm in an actuation state where the actuator is at the actuation position.

9. The bicycle pedal according to claim 5, further comprising a positioning structure configured to position the actuator at the actuation position.

10. The bicycle pedal according to claim 9, wherein the positioning structure includes an actuation-position biasing member to bias the actuator toward the actuation position.

11. The bicycle pedal according to claim 10, wherein the positioning structure includes a positioning part configured to restrict a relative movement between the pedal body and the actuator in an actuation state where the actuator is at the actuation position.

12. The bicycle pedal according to claim 5, further comprising
a release structure configured to move the actuator from the actuation position to the non-actuation position.

13. The bicycle pedal according to claim 12, wherein the release structure is movably coupled to the pedal body.

14. The bicycle pedal according to claim 13, wherein the release structure is pivotally coupled to the pedal body.

15. The bicycle pedal according to claim 13, wherein the release structure includes an engagement portion engageable with a cleat to move the actuator from the actuation position to the non-actuation position.

16. The bicycle pedal according to claim 1, wherein the movable member includes a coupling part coupled to the actuator.

17. The bicycle pedal according to claim 16, wherein the actuator is movably coupled to the coupling part.

18. The bicycle pedal according to claim 1, wherein the movable member and the actuator are rotatable relative to the pedal axle about the rotational axis.

19. The bicycle pedal according to claim 1, further comprising
a rest-position biasing member to bias the movable member toward the rest position.

20. A bicycle pedal comprising:
a pedal axle defining a rotational axis, the pedal axle being configured to be secured to a crank arm having a longitudinal axis extending from the rotational axis to a crank rotational axis of the crank arm;
a pedal body rotatably coupled to the pedal axle about the rotational axis, the pedal body having a reference axis perpendicular to the rotational axis of the pedal axle;
a movable member movable relative to the pedal body from a rest position toward an actuated position; and
an actuator configured to move the movable member from the rest position toward the actuated position in response to a first relative angle defined between the reference axis and the longitudinal axis of the crank arm when viewed in an axial direction parallel to the rotational axis of the pedal axle, wherein
the actuator includes an actuation part engageable with at least one of the pedal axle and the crank arm in response to a relative rotation between the pedal body and the crank arm about the rotational axis,
the pedal axle includes a first axle end configured to be engaged with the crank arm,
the actuation part is engageable with the first axle end in response to the relative rotation between the pedal body and the crank arm about the rotational axis, and
the actuator is provided between the first axle end and the pedal body in the axial direction.

21. A bicycle pedal comprising:
a pedal axle defining a rotational axis, the pedal axle being configured to be secured to a crank arm having a longitudinal axis extending from the rotational axis to a crank rotational axis of the crank arm;
a pedal body rotatably coupled to the pedal axle about the rotational axis, the pedal body having a reference axis perpendicular to the rotational axis of the pedal axle;
a movable member movable relative to the pedal body from a rest position toward an actuated position; and
an actuator configured to move the movable member from the rest position toward the actuated position in response to a first relative angle defined between the reference axis and the longitudinal axis of the crank arm when viewed in an axial direction parallel to the rotational axis of the pedal axle, wherein
the movable member includes a coupling part coupled to the actuator,
the actuator is movably coupled to the coupling part, and
the actuator is pivotally coupled to the coupling part about a pivot axis non-parallel to the rotational axis of the pedal axle.

* * * * *